Aug. 17, 1948.   G. E. FRANCK   2,447,060
HIGH-PRESSURE COUPLING
Filed July 15, 1944
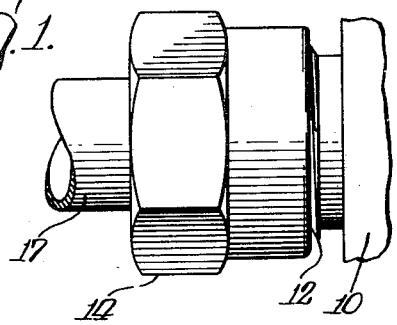
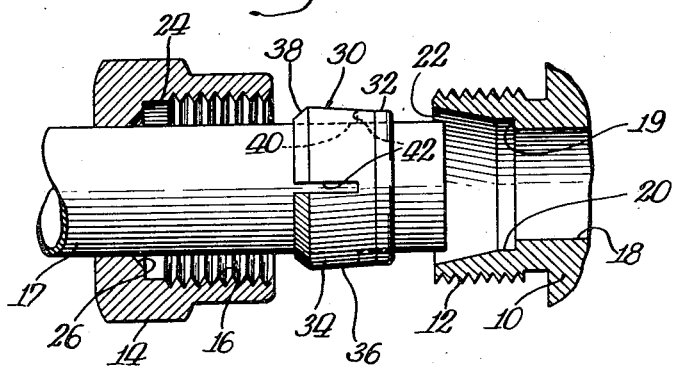
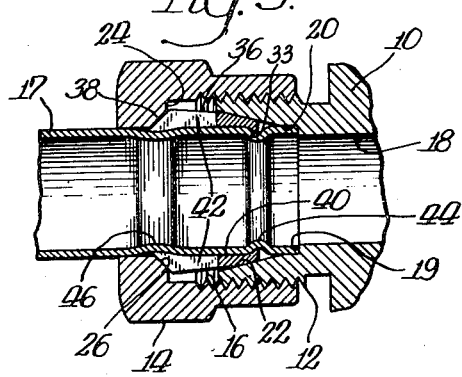
INVENTOR.
George E. Franck,
BY
Vernon D. Beehler
Atty.

Patented Aug. 17, 1948

2,447,060

UNITED STATES PATENT OFFICE 2,447,060

HIGH-PRESSURE COUPLING

George E. Franck, Riverside, Ill., assignor to The Imperial Brass Manufacturing Company, Chicago, Ill., a corporation of Illinois Application July 15, 1944, Serial No. 545,093

1 Claim. (Cl. 285—122)

My invention relates to couplings for tubing and particularly couplings which can be used on tubing where the tubing line is to carry a relatively high pressure.

Among the objects of my invention is to provide a new and improved coupling which utilizes a loose sleeve which can be compressed upon the tubing to perform the double function of making a seal at the joint resistant to high pressure and forming a grip on the tube so that the pressure will not blow the tube loose from the joint.

Another object of my invention is to provide a new and improved coupling suitable for high pressure work which makes use of what may be designated as a line contact between the tube and the adjacent corner of a surrounding sleeve for sealing and holding the joint.

Still another object of my invention is to provide a new and improved coupling suitable for high pressure work wherein a sleeve is utilized and compressed against the tubing at more than one point so that the heaviest pressure is upon a sealing corner nearest the end the lightest pressure is at a non-sealing corner of split design at a point more remote from the end of the tube so that any vibration set up in the tubing or the joint may be spread over the several areas of contact to thereby prevent concentration of vibration at a single point and minimize the tendency to produce an early fracture or failure of the coupling.

A further object is to provide a new and improved coupling joint suitable for high pressure use which features the employment of a sleeve for sealing and holding the tube in place whereby the parts of the joint which are to be compressed into contact with each other and the tubing are so arranged that the compressive effect is gradual rather than abrupt and is limited in the extent to which it can deform the tubing so that when heavy wrenches and a great deal of torque is used to make up a tight joint, presumably for holding a heavy pressure, there will not be an inadvertent deformation of the yielding parts of the coupling such as would impair the efficiency of the joint.

With these and other objects in view, my invention consists in the construction, arrangement and combination of the various parts of my device whereby the objects contemplated are attained, as hereinafter more fully set forth, pointed out in my claim and illustrated in the accompanying drawings, in which:

Figure 1 is a side view of the made-up joint in elevation.

Figure 2 is a longitudinal sectional view of the joint showing the parts separated just prior to assembly into a coupling joint.

Figure 3 is a longitudinal sectional view of the parts when the joint is completed.

Many attempts have been made in the past to produce a coupling for what is commonly known as thin-walled tubing which will withstand not only high pressure but also vibrations. Many coupling joints have been contrived, directed to the holding of rigid-walled tubing or pipe and these for the purpose intended have met with some measure of success. In actual practice, however, when joints which were designed for holding pipe are attempted to be used for coupling thin-walled metal tubing of a ductile character such as copper tubing and aluminum tubing, the joints have proved inefficient and in many cases highly unsatisfactory. Couplings which have been so constructed that they exert a great deal of lateral force upon pipe cannot be used on soft-walled tubing without so deforming the soft-walled tubing that the joint seldom remains tight or if initially tight will not long remain so in service. The idea of cutting into the outer skin of the tubing has likewise been tried but where there is an actual shearing of the surface of thin-walled tubing in actual practice the joint is prone to become weakened and is subject to fracture where the cut-in effect is exercised.

It is also a common tendency for mechanics when they realize that they are making up a joint to hold heavy pressure to exert considerable force and to pull the joint up far tighter than would be done for holding nominal pressures. More often than not excessive pressure upon a joint renders the joint less able to hold the high pressures without leaking. It therefore becomes necessary to so construct the parts of a coupling that they will not deform unduly when excessive pressure is exerted in screwing together coupling parts.

As shown in the drawing a body 10 has a threaded extension 12 thereon adapted to engage a nut 14 having corresponding internal threads 16, for the purpose of making a coupling with a tube 17. The body is provided with a central passage 18 which has an enlarged cylindrical annular recess 20, at the base of which is a shoulder 19, located within the threaded portion and a gradually sloping flare 22 which extends from the recess 20 to the outer end of the body.

The nut is provided with an annular recess 24 at the base of the threaded portion which has an inner deflecting shoulder 26 at an angle which, in the embodiment shown, is approximately 45°.

A sleeve 30 is provided which is cooperable with the body and nut and designed to be compressed between them into position upon the outer surface of the tubing in order to make up the joint. The sleeve which is of special construction has a cylindrical end 32 beveled to a slight extent at its leading edge and has an outside diameter slightly less than the diameter of the outside end of the flared recesses 22 in the body. This is to permit the sleeve to enter the recess an amount sufficient to guide it into place as pressure is exerted upon the parts of the coupling when they are assembled together. There is a relatively sharp inner corner 33 adjacent the leading edge of the sleeve which bears such a relation to the surface of the recess 22 that it will eventually be turned into a line-contact with the surface of the tube.

Immediately to the left of the cylindrical end 32 is a relatively longer section 34 forming the mid-portion of the sleeve, the outer surface 36 of which has a very gradual angular spread which in the drawings is shown to be about 5°. At the left end as viewed in Figure 2 there is a conical portion 38 which is pitched at an angle slightly less than the angle of the deflecting shoulder 26. An internal passage 40 within the sleeve is made slightly larger than the outside diameter of the tube so that the sleeve will slide easily over the tube.

The sleeve is further provided with longitudinal slots 42 of which four are shown in the drawings. These slots extend from the end of the sleeve provided with the conical face inwardly to a point adjacent the small end of the sloping portion of the sleeve.

When the joint is assembled the nut 14 is slipped over the end of the tube, the sleeve 30 is then applied and the tube is inserted into the recess of the body 10 until it abuts the shoulder 19. The end of the tube is designed to be received within the recess 20 in the body.

The sleeve 30 is then brought into contact with the body so that the cylindrical end starts to enter the body recess. The nut 14 is then threaded upon the body and gradually screwed into assembled position as shown in Figure 3.

The pressure exerted during this threading together of the coupling parts produces a deformation in the sleeve and coupling as shown in Figure 3. It should be noted that the sloping surface of the recess 22 first serves to deflect the cylindrical end 32 inwardly so that the inner edge 33 is forced into a line-contact with the surface of the tube 17. The pressure actually causes the tubing to indent rather sharply at 44 where the edge 33 is turned into contact with it.

As the cylindrical end 32 is thus deflected in a radial direction toward the center of the coupling the sleeve is gradually advanced until the outside corner of the recess 22 begins to press against the sloping surface 36. The forcible contact of these last-named parts one with respect to the other tends to seal the contact so that there will be no escape of pressure from within the tube past the contacting surfaces respectively of the outside of the sleeve and the inside of the body recess which rubs frictionally against it. As pressure is begun to be exerted against the sloping surface at a point adjacent the middle of the sleeve, continued pressure upon the cylindrical end is relieved. That is to say, the effect of the compressive force upon the sleeve is spread over a greater area and is exerted to a lesser extent at the area more remote from the forward contacting edge 33.

A continued application of pressure formed by the coupling together of the parts of the joint serves to force the deflecting shoulder 26 against the conical end 38 of the sleeve. This action tends to reduce the large end of the sleeve in size circumferentially a slight amount due to the presence of longitudinal slots 42. The force of pressure at this point likewise serves to deflect the end of the coupling to a slight extent into the tubing forming a shallow depression 46. The grip of the sleeve 30 upon the tubing at this point is far less than at the other end. By thus graduating the effect of the pressure of the sleeve upon the tubing it is possible to avoid concentrating the effects of vibration upon a single annular line of contact.

In forming a high pressure coupling of this kind where the sleeve has been made in a special design the greatest force of contact occurs adjacent the leading edge 32 of the sleeve and a lesser degree of force is exerted upon the portion of the sleeve adjacent the base of the sloping surface. A substantial minimum deflection is finally exerted opposite the slotted end of the sleeve against the tubing at a point remote from the principal deflecting edge.

A joint made up in this manner tends to provide a line support between the leading edge of the sleeve and the tubing and also permits the outside surface at the end of the sleeve adjacent the cylindrical end 32 to exert some force upon the tubing. Under these circumstances when the tube is vibrated with respect to the coupling some vibration will be absorbed by the conical end 38 of the sleeve, an additional amount will be absorbed by the main body operation of the sleeve and the remaining portion will be absorbed by the internal corner 33. This graduated degree of holding the sleeve against the tubing spreads the effect of vibration and minimizes the likelihood of fracture due to vibration.

Further, in view of the very positive clamping action of the sleeve, and the fact that it is deformed at not less than two separate areas of support the joint will hold together without the seal being broken under relatively high pressure conditions.

There has thus been provided a high pressure coupling joint which is sufficiently tight to hold high pressure and sufficiently resistant to vibration in order to insure a long life of the joint under exceptionally demanding circumstances.

Some changes may be made in the construction and arrangement of the parts of my device without departing from the real spirit and purpose of my invention, and it is my intention to cover by my claim any modified forms of structure, or use of mechanical equivalents, which may be reasonably included within its scope.

I claim as my invention:

In a compression coupling for tubing having a first member having a threaded portion and a passage therethrough including a substantially cylindrical enlargement forming a recess adapted to receive and a shoulder adapted to be abutted by an end of the tubing and a conical portion flaring gently outwardly from the recess to the end of said member and a second member adapted for threaded engagement with said first member and having a recess therein facing said first member and a sloping distorting shoulder at the bottom of said last named recess having a relatively sharp inclination, a sleeve initially having a bore of uniform diameter capable of sliding freely over the tubing, said sleeve having a cylindrical leading portion with a beveled end face, a mid portion having an outer, gently sloping, conical surface and a rear portion having a sharply sloping conical surface, said sleeve having a plurality of longitudinal slits opening through the rear portion and extending inwardly to a position short of said leading portion.

GEORGE E. FRANCK.

REFERENCES CITED

The following references are of record in the file of this patent:

UNITED STATES PATENTS

| Number | Name | Date |
|---|---|---|
| 1,428,949 | Eastman | Sept. 12, 1922 |
| 2,179,127 | Lauer | Nov. 7, 1939 |